United States Patent [19]
Johnson

[11] Patent Number: 5,090,713
[45] Date of Patent: Feb. 25, 1992

[54] ELASTOMERIC GASKET FOR SEALING A GLASS FIBER REINFORCED COVER TO A VAULT

[76] Inventor: Roy E. Johnson, 12308 Aegean St., Norwalk, Calif. 90650

[21] Appl. No.: 633,074

[22] Filed: Dec. 24, 1990

[51] Int. Cl.⁵ .................. F16J 15/00; B65D 53/00; E04B 1/66
[52] U.S. Cl. .................. 277/166; 277/207 R; 277/213; 277/215; 52/169.7; 52/140; 52/403; 404/25
[58] Field of Search .................. 277/166, 207 R, 215, 277/180, 101, 126, 128, 186, 189, 213; 52/200, 169.7, 403, 135, 140, 141; 404/25; 27/2, 7, 17

[56] References Cited

U.S. PATENT DOCUMENTS

| | | | |
|---|---|---|---|
| 3,065,517 | 11/1962 | Dower | 277/207 R |
| 3,327,429 | 6/1967 | Slaughter | 27/17 |
| 3,892,417 | 7/1975 | Clayton | 277/207 R |
| 3,936,059 | 2/1976 | Gordon | 277/166 |
| 4,158,757 | 6/1979 | Reichert et al. | 277/166 X |
| 4,476,657 | 10/1984 | Juba et al. | 52/135 X |
| 4,555,119 | 11/1985 | Semon | 27/17 |
| 4,567,697 | 2/1986 | Hahne et al. | 404/25 X |
| 4,758,004 | 7/1988 | Semon | 277/207 R |
| 4,828,275 | 5/1989 | Udagawa | 277/215 X |

Primary Examiner—William A. Cuchlinski, Jr.
Assistant Examiner—James K. Folker
Attorney, Agent, or Firm—Edgar W. Averill, Jr.

[57] ABSTRACT

A gasket secured to the cover frame of an underground vault. The vault is of the type having a precast underground portion and an upper opening including a steel cover frame with a horizontal, flat surface to which the gasket is adhered. The gasket has a plurality of ridges along its inner edge, a flat center portion wherein the bolt holes are located and an outer ridge adjacent the bolt holes but separated from the outer edge.

3 Claims, 2 Drawing Sheets

ELASTOMERIC GASKET FOR SEALING A GLASS FIBER REINFORCED COVER TO A VAULT

BACKGROUND OF THE INVENTION

The invention is utility vaults, and the invention relates more particularly to gaskets for utility vaults of the type which have glass fiber reinforced polymeric covers. Such covers typically have a rather rough undersurface and are not easily sealed with a flat gasket. For this reason, a gasket with a plurality of inner ridges and being fabricated from a relatively soft elastomer has been used. Unfortunately, the use of such gaskets can lead to the cracking and breaking of the vault cover adjacent the bolt holes. If the bolts are properly tightened, that is, tightened to a first level for each bolt and then all bolts should be torqued slightly more and in this way, the prior art gasket will work successfully. Unfortunately, in the real world, it is quite common for the bolts along one side to be tightened to a relatively high degree before the bolts on the other side are tightened at all. This leads to a bending and potential breaking of the cover adjacent the originally tightened bolt holes.

SUMMARY OF THE INVENTION

It is an object of the present invention to provide a gasket which supports the gasket cover even if incorrectly tightened and which still provides adequate sealing against the rough undersurface of the vault cover.

The present invention is for a gasket secured to the cover of the frame of an underground vault. The vault is of the type having a precast underground portion and an upper opening including a steel cover frame which has a horizontal, flat surface for supporting a gasket. The vault is also of the type which has a glass fiber reinforced polymer cover including recessed bolt openings. The improved gasket of the present invention comprises a rectangular, elastomeric member having four sides, each side having an inner peripheral edge and an outer peripheral edge. Each side further includes a plurality of centrally located bolt holes and has a cross-sectional shape which includes a flat bottom which is affixed to the horizontal, flat surface of the steel cover frame and a plurality of adjacent ridges beginning at the inner edge thereof. An innermost ridge has the greatest height of this set of ridges. A thin, flat area is located in the center of the cross-sectional shape, and the bolt holes are located in this area. At least one outer ridge is located adjacent the thin, flat area and separated from the outer edge, and the outer ridge is of a less height than the innermost ridge. Preferably, there is a single outer ridge which is located adjacent the bolt holes in the thin center area.

DESCRIPTION OF THE PREFERRED EMBODIMENTS

Figure 1:
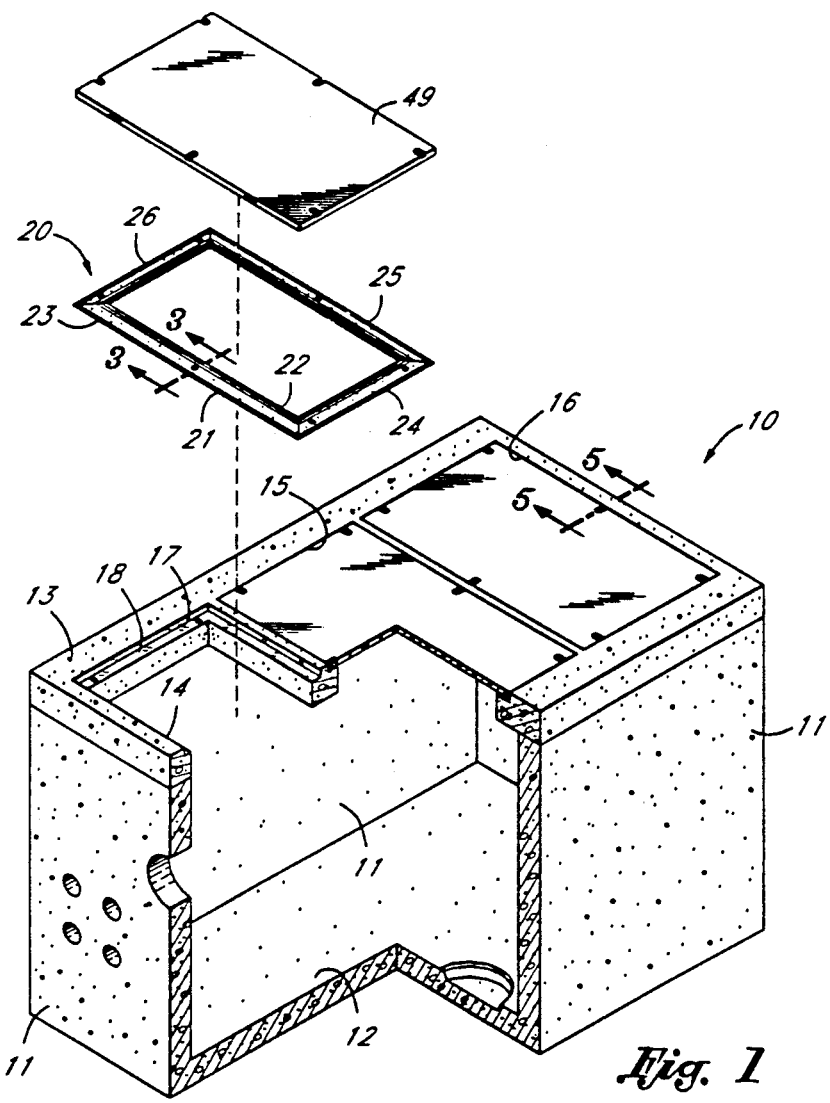
FIG. 1 is an exploded perspective view showing the vault, vault gasket and cover which includes the gasket of the present invention.

A precast underground vault is shown in perspective view in FIG. 1 and indicated by reference character 10. Vault 10 has four sides 11 and a bottom 12. The upper surface 13 has three rectangular openings and indicated generally by reference characters 14, 15 and 16. An L-shaped steel member 17 is cast in the top 13 and is shown in enlarged view in FIGS. 4 and 5. There it can be seen that L-shaped member 17 has a horizontal, flat surface 18 to which a gasket is glued or otherwise affixed.

Figure 3:
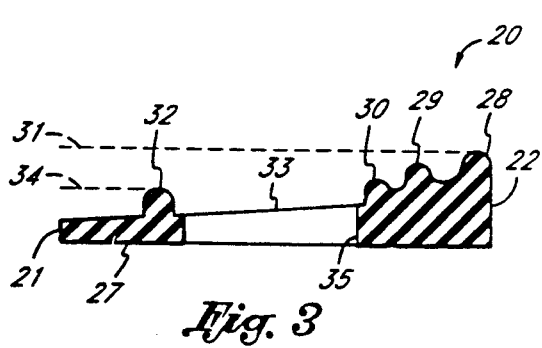
FIG. 3 is a cross-sectional view taken along line 3—3 of FIG. 1.

The gasket of the present invention is shown in perspective view in FIG. 1 and indicated by reference character 20. Gasket 20 has an inner peripheral edge 22 and four sides 23, 24, 25 and 26. The gasket is shown in cross-sectional view in FIG. 3 where it can be seen that gasket 20 has a flat bottom 27 and three ridges adjacent inner edge 22, said ridges being indicated by reference characters 28, 29 and 30. Ridge 28 is the innermost ridge and has a height indicated by dotted line 31 and can be seen to have the greatest height from flat bottom 27. Gasket 20 can also be seen to have an outer ridge 32 which is adjacent the thin, flat area 33 in the center and which has a height indicated by reference character 34 which can be seen to be substantially less than the height of innermost ridge 28. It can also be seen that ridges 30 and 32 are closely adjacent bolt hole 35.

Figure 2:
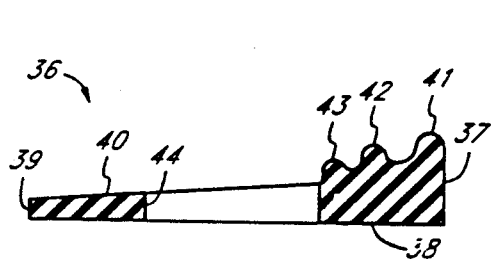
FIG. 2 is a cross-sectional view of a prior art gasket.

The prior art gasket is shown in FIG. 2 and indicated by reference character 36. Prior art gasket 36 has an innermost edge 37, a flat bottom 38, an outer edge 39, a large, flat area 40, an innermost ridge 41, a second ridge 42 and a third lower ridge 43. A bolt hole 44 is adjacent ridge 43.

Figure 4:
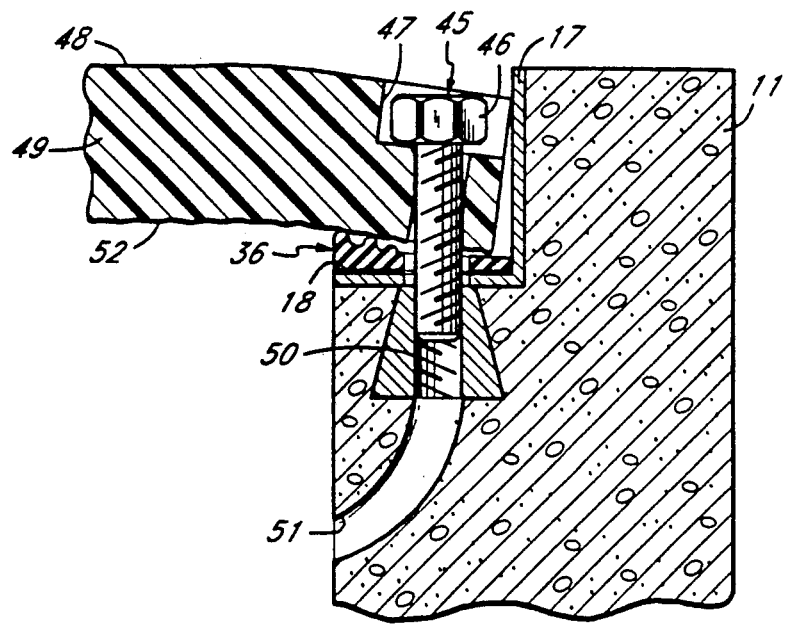
FIG. 4 is an enlarged cross-sectional view of the upper portion of the vault including a prior art gasket and a bolt overtightened in a glass fiber reinforced polymeric cover.

The use of the prior art gasket is shown in FIG. 4 where a bolt 45 has bolt head 46 which abuts a recess 47 which is a generally U-shaped recess to permit the bolt head 46 to not protrude above the upper surface 48 of cover 49. Bolt 45 is held in a threaded insert 50 which opens to a dirt passageway 51 which prevents dirt from collecting in the threaded opening.

In use, it is not uncommon for the bolts along one side of the cover to be completely tightened before any bolts are placed in any of the other openings. It can be seen by a view of FIG. 4 combined with a knowledge of leverage that when the bolts along the other side of cover 49 are tightened that it is likely that the cover 49 will crack or break adjacent recess 47 and such is often the case.

Figure 5:
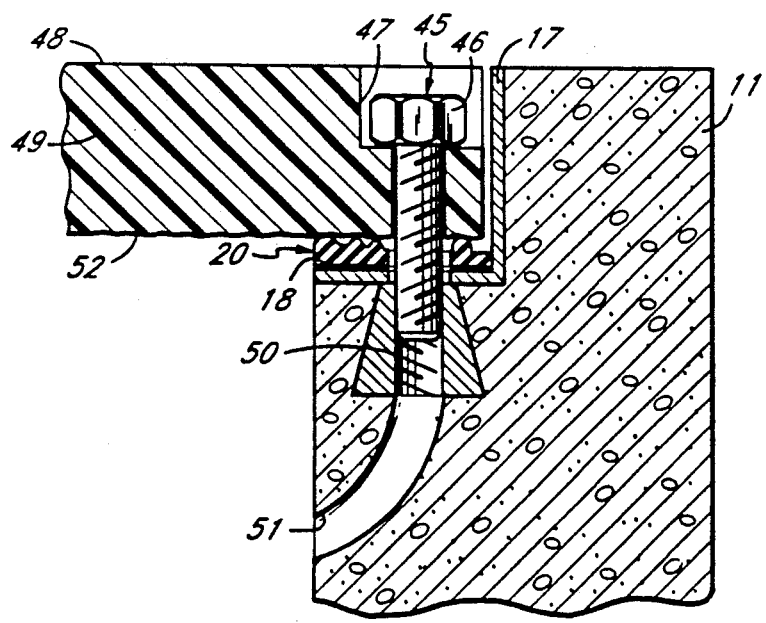
FIG. 5 is a cross-sectional view showing the upper portion of a vault including the gasket of the present invention and showing a bolt tightened against a glass fiber reinforced polymeric cover.

The gasket 20 of the present invention is shown in cross-sectional view in FIG. 5 where it can be seen that bolt 45 does not cause the same deflection of the cover because the undersurface 52 of cover 49 abuts outer ridge 32. The height of outer ridge 32 is less than that of the innermost ridge 28 and, thus, the innermost ridge 28 can still be deflected and help seal undersurface 52 to gasket 20. It should be noted that undersurface 52 is often quite rough because of the common manufacturing technique wherein the cover is cast in a mold wherein the undersurface is the upper surface of the mold which is open and thus ends up with an uneven surface. If a smooth undersurface was formed, a flat gasket would be satisfactory. It should also be noted that a soft, flat, foam gasket would be unsatisfactory since it would be torn up when the cover is removed.

Thus, the gasket of the present invention does an excellent job of sealing while also preventing cover breakage and still permitting the removal and replacement of covers without damage.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved vault sealing assembly of the type including a gasket secured to a cover frame of an underground vault, said vault being of the type having a precast underground portion and an upper opening including a steel cover frame including a horizontal flat surface for supporting a gasket and said vault being of the type having a glass fiber reinforced polymeric cover including recessed bolt openings on all four sides and having a generally flat undersurface wherein the improvement comprises:

a rectangular elastomeric member having four sides, each side having an inner peripheral edge and an outer peripheral edge, each side including a plurality of centrally located bolt holes, each side having a cross-sectional shape which includes an inner edge and an outer edge and a flat bottom affixed to the horizontal flat surface of said steel cover frame, said member having a plurality of adjacent ridges beginning at the inner edge thereof and including an innermost ridge which has the greatest height, a thin, flat area in the center of said cross-sectional shape in which said bolt holes are located and at least one outer ridge adjacent the thin, flat area and separated from the outer edge, and located between said bolt holes and said outer edge said outer ridge being of less height than the innermost ridge and said outer ridge extending past each of said plurality of bolt holes.

2. The improved vault sealing assembly of claim 1 wherein said at least one outer ridge is adjacent said bolt holes.

3. The improved vault sealing assembly of claim 1 wherein there is a single outer ridge.

* * * * *